United States Patent
Enomoto

[11] Patent Number: 6,127,667
[45] Date of Patent: Oct. 3, 2000

[54] MECHANISM AND METHOD FOR CORRECTING TREMBLING OF FOCUSED IMAGE

[75] Inventor: Shigeo Enomoto, Tokyo, Japan

[73] Assignee: Asahi Kogaku Kogyo Kabushiki Kaisha, Tokyo, Japan

[21] Appl. No.: 09/150,905

[22] Filed: Sep. 10, 1998

[30] Foreign Application Priority Data

Sep. 12, 1997 [JP] Japan .................................. 9-268065

[51] Int. Cl.[7] .................................................. G03B 5/00
[52] U.S. Cl. ........................ 250/201.2; 396/55; 348/208
[58] Field of Search ............................ 250/201.2–201.4, 250/201.6–201.8, 204; 348/208; 396/52, 54, 55; 359/694

[56] References Cited

U.S. PATENT DOCUMENTS

| | | |
|---|---|---|
| 4,965,619 | 10/1990 | Shikaumi et al. ........................ 354/410 |
| 4,996,545 | 2/1991 | Enomoto et al. . |
| 5,150,150 | 9/1992 | Enomoto . |
| 5,305,040 | 4/1994 | Enomoto . |
| 5,541,693 | 7/1996 | Enomoto . |
| 5,583,597 | 12/1996 | Enomoto . |
| 5,655,157 | 8/1997 | Enomoto . |
| 5,659,806 | 8/1997 | Miyamoto et al. ........................ 396/54 |
| 5,721,969 | 2/1998 | Arai . |
| 5,748,995 | 5/1998 | Kitagawa et al. ........................ 348/208 |
| 5,881,325 | 3/1999 | Imura et al. ................................ 396/55 |
| 5,946,503 | 8/1999 | Washisu ..................................... 396/55 |
| 5,995,762 | 11/1999 | Enomoto et al. .......................... 396/55 |

FOREIGN PATENT DOCUMENTS 7-261230  10/1995  Japan .

Primary Examiner—Stephone B. Allen
Attorney, Agent, or Firm—Greenblum & Bernstein, P.L.C.

[57] ABSTRACT

An angular speed of an optical axis of an optical device is detected by a gyro sensor, and inputted to a first A/D converting input terminal of a CPU. A position data of a correction optical system is sensed by a PSD, and inputted to a second A/D converting input terminal of the CPU. The inputted data both of the first and the second A/D converting input terminals is converted to a digital signal. The digital signal of the angular speed is stored in an integration register. The digital signal of the position data is stored in a correction optical system position register. When a trembling speed of a focused image changes from a speed higher than a maximum driving speed of the correction optical system to a speed lower than the maximum speed, the data stored in the correction optical system position register is copied to the integration register.

16 Claims, 12 Drawing Sheets

MECHANISM AND METHOD FOR CORRECTING TREMBLING OF FOCUSED IMAGE

BACKGROUND OF THE INVENTION

1. Field of the Invention

The present invention relates to a mechanism provided in an optical device, for correcting a trembling of a focused image.

2. Description of the Related Art

Conventionally, there is known an optical device, such as a still camera or binoculars, which is provided with a mechanism for correcting a trembling of a focused image. The mechanism for correcting the trembling includes correction optical systems. The correction optical systems are driven in predetermined directions on a plane perpendicular to the optical axes of the correction optical systems, so that movement of the other optical systems of the optical device is canceled, whereby the trembling of the focused image is corrected.

However, if a trembling speed of the focused image is higher than a maximum driving speed of the correction optical systems, the correction optical systems are driven at the maximum speed in a direction which cancels the movement of the optical axes of the other optical systems. In such a situation, even if the trembling speed is slightly reduced to a speed lower than the maximum driving speed of the correction optical systems, or the focused image begins to move in an opposite direction, the correction optical systems are still driven at the maximum driving speed in the same direction. Namely, this case results in the correction optical systems being driven at a speed higher than a speed by which the correction optical systems should be driven, or in a direction opposite to a direction in which the correction optical systems should be driven. Consequently, the trembling becomes serious, and inconveniencing a user.

SUMMARY OF THE INVENTION

Therefore, an object of the present invention is to provide a correction mechanism for the trembling and a method for correcting the trembling, in which a stable control of the correction of the trembling is maintained at all times.

In accordance with an aspect of the present invention, there is provided a mechanism correcting a trembling of a focused image that comprises: a detector detecting an angular speed of a trembling of an optical axis of an optical device; an integrator that converts the angular speed to an angular data of the optical axis by integrating outputs from the detector; correction optical systems that correct a trembling of a focused image; driving systems that drive the correction optical systems; obtaining systems that obtain a position data of the correction optical systems; and a controlling system that controls the driving systems whereby a difference between the angular data of the optical axis and the position data of the correction optical systems is canceled, wherein the controlling system replaces a value outputted from the integrator with a value substantially equivalent to a value outputted from the obtaining systems, on the occurrence of a value predetermined condition.

The controlling system may replace the value outputted from the integrator with the value outputted from the obtaining systems when a trembling speed of the optical axis changes from a speed higher than a maximum speed of the driving system to a speed lower than the maximum speed.

The controlling system may also replace the value outputted from the integrator with the value outputted from the obtaining systems, at intervals of a predetermined time after the driving of the correction optical systems is started.

The controlling system adds or subtracts a predetermined value to or from the value outputted from the obtaining systems, and replaces the value outputted from the integrator with the value outputted from the obtaining systems, so as to maintain a driving direction of the correction optical system at a moment when the value outputted from the integrator is replaced with the value outputted from the obtaining systems.

The controlling system adds the predetermined value to the value outputted from the obtaining systems, when the driving direction is a first direction, and the controlling system subtracts the predetermined value from the value outputted from the obtaining systems, when the driving direction is a second direction which is opposite to the first direction.

The driving systems may include a stepping actuator, with the corresponding correction optical system being driven by a predetermined amount when the stepping actuator is driven, and when the predetermined value is higher than a threshold value by which the step driving of the stepping actuator is performed, step driving of the stepping actuator occurs.

The driving systems may include an actuator which is provided with an electromagnetic coil, and the obtaining systems may optically sense the position data.

Alternatively, the driving systems may include a stepping actuator, and the obtaining systems may calculate the position data from the number of steps by which the stepping actuator is driven.

In accordance with another aspect of the present invention, there is provided a mechanism correcting a trembling of a focused image that comprises: a detector detecting an angular speed of a trembling of an optical axis of an optical device; integrators that convert the angular speed to an angular data of the optical axis by integrating outputs from the detector; correction optical systems that correct a trembling of a focused image; driving systems that drive the correction optical systems; obtaining systems that obtain a position data of the correction optical systems; and a controlling system that controls the driving systems, such that a difference between the angular data of the optical axis and the position data of the correction optical systems is canceled, wherein the controlling system stops the driving systems, halting the correction optical systems at a current position, on the occurrence of a predetermined condition.

On the occurrence of the predetermined condition, the difference is deemed to be zero and the controlling system stops the correction optical systems at the current position.

In accordance with another aspect of the present invention, there is provided a method for correcting a trembling of a focused image that comprises: a first step in which an angular speed of an optical axis of an optical device is sensed; a second step in which the angular speed is integrated and converted to an angular data of the optical axis; a third step in which a position data of correction optical systems, which correct a trembling of a focused image, is obtained; and a fourth step in which the correction optical systems are driven such that a difference between the angular data and the position data is canceled, wherein, in the fourth step, the angular data is replaced with data substantially equivalent to the position data on the occurrence of a predetermined condition.

The predetermined condition may be that a trembling speed of the optical axis changes from a speed higher than a maximum speed of the driving system, to a speed lower than the maximum speed.

Alternatively, the predetermined condition may be that a predetermined time has elapsed.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 1:
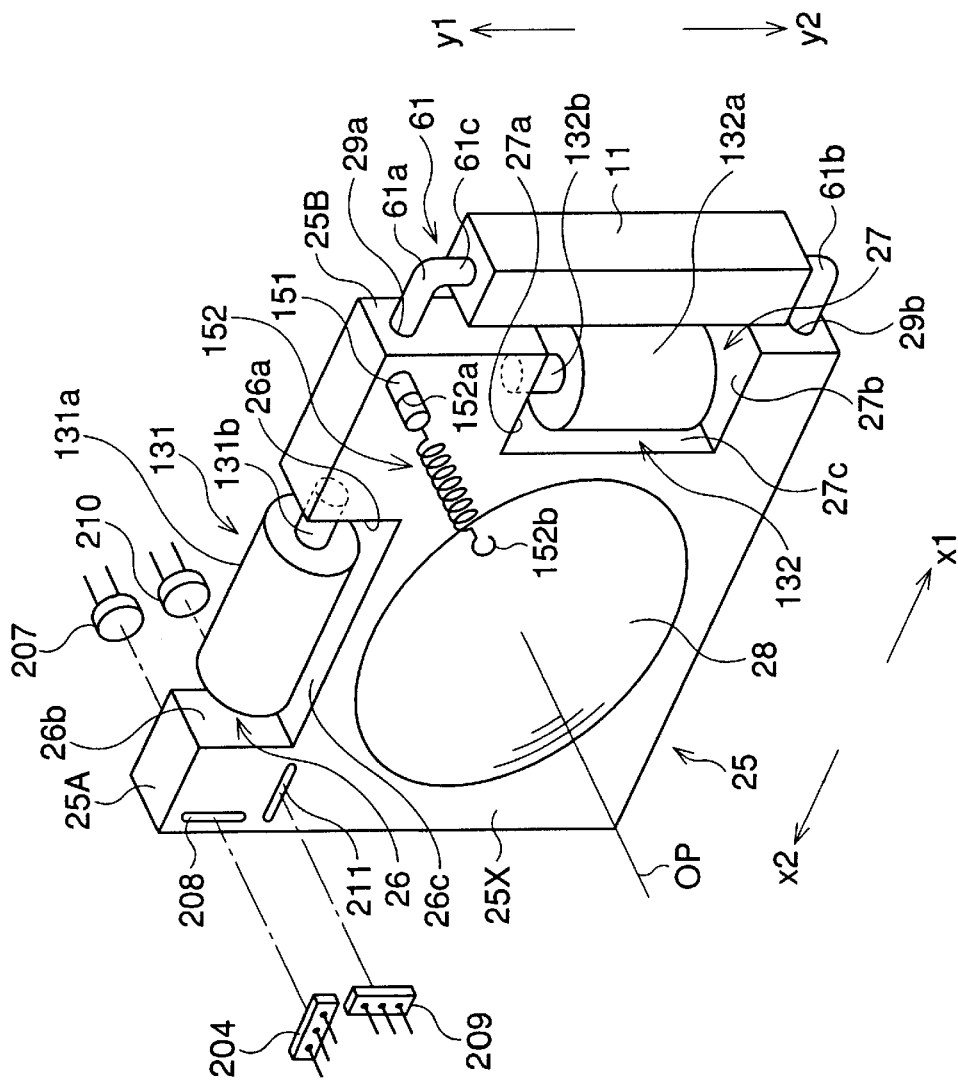
FIG. 1 is a perspective view showing a mechanism for correcting a tremble of a focused image, to which a first embodiment, according to the present invention, is applied.

The present invention will now be described with reference to embodiments shown in the drawings. Note that, in this specification, "lengthwise direction" means a vertical direction in a state when an optical device, which is provided with a correction mechanism according to the present invention, is normally used, and "lateral direction" means a direction which is perpendicular to the lengthwise direction.

FIG. 1 is a perspective view showing a mechanism for correcting a tremble of a focused image, to which a first embodiment, according to the present invention, is applied.

A correction lens 28 is held by a lens holding frame, generally indicated by reference 25. The lens holding frame 25 is a plate including a plane surface 25X, perpendicular to an optical axis OP of the correction lens 28. A configuration of the lens holding frame 25, taken along a plane parallel to the plane surface 25X, is generally rectangular. An upper side surface 25A of the lens holding frame 25 is perpendicular to the plane surface 25X, and is parallel to a plane, proceeding in the lateral direction, in which the optical axis OP lies. A right side surface 25B of the lens holding frame 25 is perpendicular to the plane surface 25X, and is parallel to a plane, proceeding in the lengthwise direction, in which the optical axis OP lies. The upper side surface 25A and the right side surface 25B are perpendicularly contiguous. A recess portion 26 is formed in the upper side surface 25A of the lens holding frame 25. A recess portion 27 is formed in the right side surface 25B of the lens holding frame 25.

Note that in an optical device to which the first embodiment is applied, a luminance flux, having passed through an objective lens, passes through the correction lens 28, and is directed to an eyepiece through an optical inversion system, such as a roof prism or Porro prism. Namely, the lens holding frame 25 is mounted in the optical device in such a manner that the correction lens 28 is disposed between the objective lens and the optical inversion system. Further, in this specification, "standard position" means a position in which the optical axis of the correction lens 28 is coaxial with the optical axis of the other optical systems of the optical device.

A first direct-drive-type actuator, generally indicated by reference 131, is provided in the recess portion 26. The first direct-drive-type actuator 131, for example, a direct-drive-type solenoid, comprises a stationary drive coil case 131a and a movable shaft 131b. The shaft 131b rotatably extends or retracts along the longitudinal axis thereof. A direction and an amount of the movement of the shaft 131b is determined by a direction and an amount of electric current which is applied to a drive coil (omitted in FIG. 1) mounted in the drive coil case 131a. The drive coil case 131a is secured to an inner surface (omitted in FIG. 1) of an outer frame (not shown) of the optical device. The tip or projecting end-face of the shaft 131b is in slidable contact with the external surface 26a.

A second direct-drive-type actuator, generally indicated by reference 132, is provided in the recess portion 27. The second direct-drive-type actuator 132 comprises a stationary drive coil case 132a and a movable shaft 132b, similar to the first direct-drive-type actuator 131. A direction and an amount of the movement of the shaft 132b is decided by a direction and an amount of electric current which is applied to a drive coil (omitted in FIG. 1) mounted in the drive coil case 132a. The drive coil case 132a is secured to the inner surface of the outer frame of the optical device. The tip or projecting end-face of the shaft 132b is in slidable contact with the external surface 27a.

A hole 29a and a hole 29b, which have a predetermined depth, are provided at the top and bottom, respectively, of the right side surface 25B. A central axis of the holes 29a and 29b is parallel to the upper side surface 25A. A guide bar 61 comprises lateral-direction guide portions 61a and 61b, which are parallel to each other, and a lengthwise-direction guide portion 61c, which connects the lateral-direction guide portions 61a and 61b. The length of the lengthwise-direction guide portion 61c, along its central axis, approximately equals a distance between the holes 29a and 29b. The lateral-direction guide portion 61a is slidably received by the hole 29a, and the lateral-direction guide portion 61b is slidably received by the hole 29b.

The lengthwise-direction guide portion 61c is supported by a projecting portion 11, formed on the inner surface of the outer frame of the optical device, so as to be slidable in a longitudinal direction along the central axis thereof.

A pin 151 is provided on the plane surface 25X, at a portion adjacent to a corner at which the upper side surface 25A and the right side surface 25B meet. One end 152a of a coil spring 152 is attached to the pin 151, and another end 152b of the coil spring 152 is engaged with a projecting portion (omitted in FIG. 1) of the inner surface of the optical device, so that the lens holding frame 25 is urged in a direction towards the optical axis OP, at a declination of 45 degrees from the lateral direction when in the standard position, in a plane perpendicular to the optical axis OP.

Accordingly, the lens holding frame 25 is resiliently biased in such a manner that the tip of the shaft 131b of the first direct-drive-type actuator 131 is in slidable contact with the external surface 26a of the recess portion 26 at all times, and the tip of the shaft 132b of the second direct-drive-type actuator 132 is in slidable contact with the external surface 27a of the recess portion 27 at all times, whereby the pressure exerted by the tip of the shaft 131b on the surface 26a and the pressure exerted by the tip of the shaft 132b on the surface 27a are substantially equal.

The lens holding frame 25 is provided with a first slit 208, which is used for sensing a position of the lens holding frame 25 in the lateral-direction, and a second slit 211, which is used for sensing a position of the lens holding frame 25 in the lengthwise-direction. A longitudinal direction of a sectional view of the first slit 208, taken along the plane surface 25X, is perpendicular to the direction in which the shaft 131b extends or retracts. A longitudinal direction of a sectional view of the second slit 211, taken along the plane surface 25X, is perpendicular to the direction in which the shaft 132b extends or retracts.

A first LED (Light Emitting Diode) 207, disposed a predetermined distance from the lens holding frame 25, corresponds to the first slit 208. A first PSD (Position Sensitive Device) 204 is disposed at a side of the lens holding frame 25 opposite to the side at which the first LED 207 is disposed. A second LED 210, disposed a predetermined distance from the lens holding frame 25, corresponds to the second slit 211. A second PSD 209 is disposed at a side of the lens holding frame 25 opposite to the side at which the second LED 210 is disposed.

A luminance flux outputted from the first LED 207 passes through the first slit 208 and becomes incident on the first PSD 204. The position in the lateral-direction of the lens holding frame 25 is detected by the position on the first PSD 204 at which the luminance flux becomes incident. A luminance flux outputted from the second LED 210 passes through the second slit 211 and becomes incident on the second PSD 209. The position in the lengthwise-direction of the lens holding frame 25 is detected by the position on the second PSD 209 at which the luminance flux becomes incident.

When an electric current is applied to the drive coil of the drive coil case 131a of the first direct-drive-type actuator 131 in a first direction, the shaft 131b extends in the direction x1, so that the lens holding frame 25 is moved in the direction x1. When the electric current is applied to the drive coil in the drive coil case 131a, in a second direction, the shaft 131b retracts in the direction x2, so that the lens holding frame 25 is moved in the direction x2 due to the urging force of the coil spring 152.

When an electric current is applied to the drive coil in the drive coil case 132a of the first direct-drive-type actuator 132 in a first direction, the shaft 132b extends in the direction y1, so that the lens holding frame 25 is moved in the direction y1. When the electric current is applied to the drive coil in the drive coil case 132a, in a second direction, the shaft 132b retracts in the direction y2, so that the lens holding frame 25 is moved in the direction y2 due to the urging force of the coil spring 152.

Figure 2:
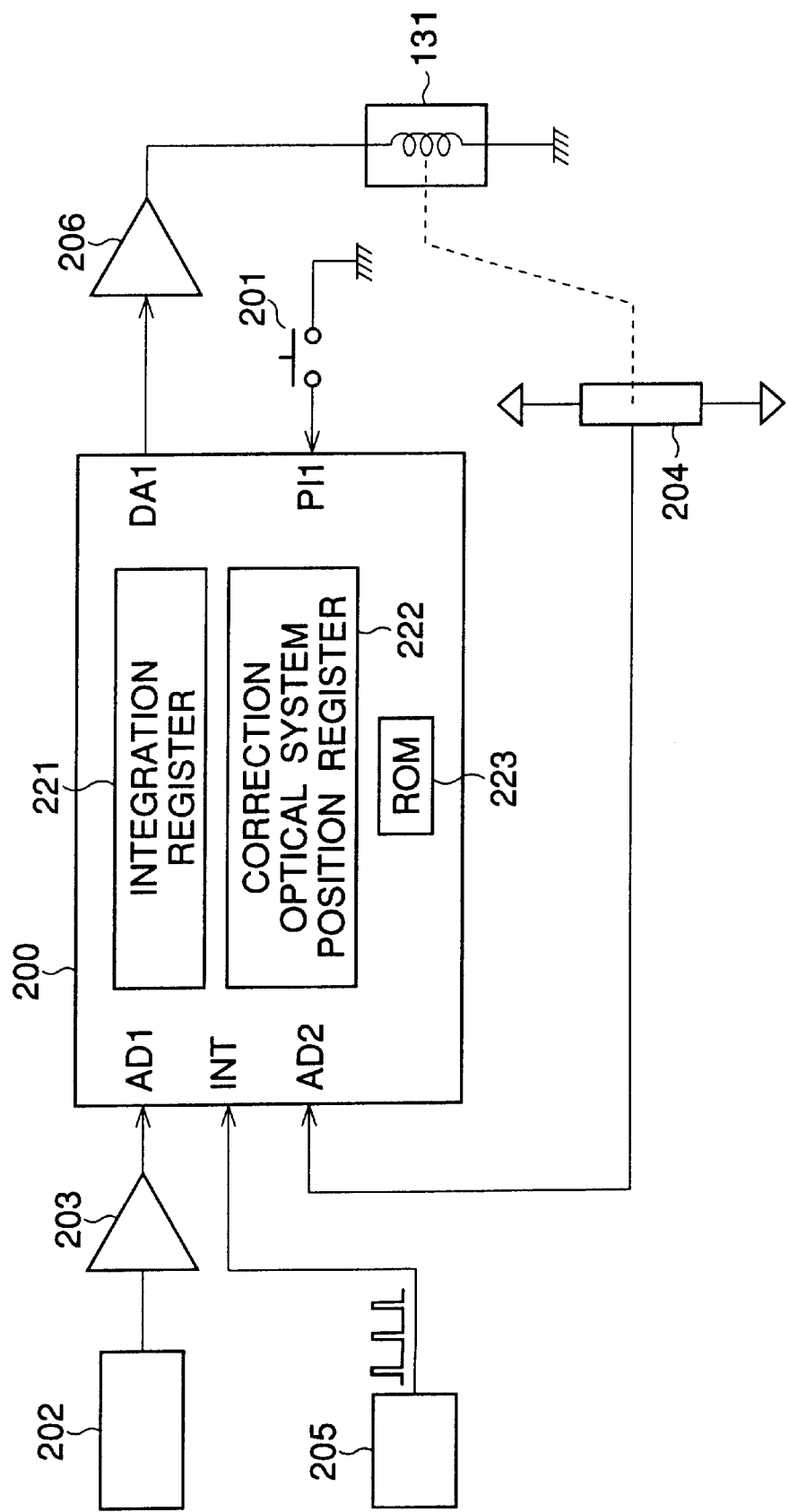
FIG. 2 is a block diagram of the first embodiment.

FIG. 2 is a block diagram showing a circuit structure of control circuits for the trembling, provided in the optical device of the first embodiment, which correct the trembling of the focused image in the lateral-direction. A CPU 200 is a microcomputer which controls the correction of the trembling of the focused image as a whole. When a switch 201 is ON, the correction of the trembling is started. The output signal of the switch 201 is inputted to an input port PI1 of the CPU 200. A lateral-direction gyro sensor 202 outputs an angular speed signal indicating the direction and the amount of the movement in the lateral direction of the optical axis of the optical device. A lateral-direction amplifier 203 is connected to the lateral-direction gyro sensor 202, whereby the angular speed signal is amplified. The lateral-direction amplifier 203 is connected to the CPU 200. The amplified signal of the angular speed, outputted from the lateral-direction amplifier 203, is inputted to a first A/D converting input terminal AD1.

As described previously, the signal outputted by the first PSD 204 indicates the position data, in the lateral direction, of the correction lens 28 due to the incident luminous flux from the first LED 207. The first PSD 204 is connected to the CPU 200, so that the position data is inputted to a second A/D converting input terminal AD2.

Note that, the A/D converting input terminal includes a converting circuit by which an analog signal is converted to a digital signal in accordance with the control of the CPU 200.

An oscillator 205 outputs an interruption signal which determines an A/D conversion period in the first and second A/D converting input terminals AD1 and AD2. The oscillator 205 is connected to the CPU 200, so that the interruption signal is inputted to an external interruption terminal INT. Thus, in accordance with the interruption signal, an interruption routine is initialed at every pulse, being one msec (millisecond), for example, and the A/D conversion is also performed, in the first and second A/D converting input terminals AD1 and AD2, at every pulse, so that each digital signal is read in the CPU 200.

The digital signals, converted in the first and second A/D converting terminals AD1 and AD2, are subjected to a predetermined process, and outputted from a D/A converting output terminal DA1. A lateral-direction power amplifier 206 is connected to the D/A converting output terminal DA1, so that the output signal of the D/A converting output terminal DA1 is amplified.

Note that, the D/A converting output terminal is provided with a converting circuit by which digital signals, stored in each register of the CPU 200, are converted to analog signals in accordance with the control of the CPU 200, and the analog signals are outputted from the D/A converting output terminal.

Further, the first direct-drive-type actuator 131, which drives the correction lens 28 in the lateral direction, is connected to the lateral-direction power amplifier 206. Namely, the correction lens 28 is driven in the lateral direction by the first direct-drive-type actuator 131, in accordance with the signal outputted from the D/A converting output terminal DA1 and amplified by the lateral-direction power amplifier 206.

The CPU 200 is provided with an integration register 221, a correction optical system position register 222 and a ROM 223. The integration register 221 is used to integrate the angular speed signals outputted from the lateral-direction gyro sensor 202 and to obtain the trembling angular data of the optical device (the optical axis). The correction optical system position register 222 is a register in which the position data of the correction lens 28, outputted from the first PSD 204, is stored. Any data, such as a maximum speed of the correction lens 28, is stored in the ROM 223. The maximum speed of the correction lens 28 is a maximum value at which the first and second direct-drive-type actuators 131, 132 can drive the correction lens 28. The value of the maximum speed, stored in the ROM 223, is calculated in advance by experiment.

Note that equipment such as a gyro sensor, the PSD 209, a lengthwise-direction amplifier and a lengthwise-direction power amplifier for correcting the trembling in the lengthwise direction, similar to those of the lateral direction, are connected to the CPU 200, so that, with respect to the lengthwise direction, a similar correction to that in the lateral direction is performed. The lengthwise-direction power amplifier is connected to the second direct-drive-type actuator 132. The second direct-drive-type actuator 132 is driven in accordance with a driving signal outputted from the lengthwise-direction power amplifier.

Figure 3:
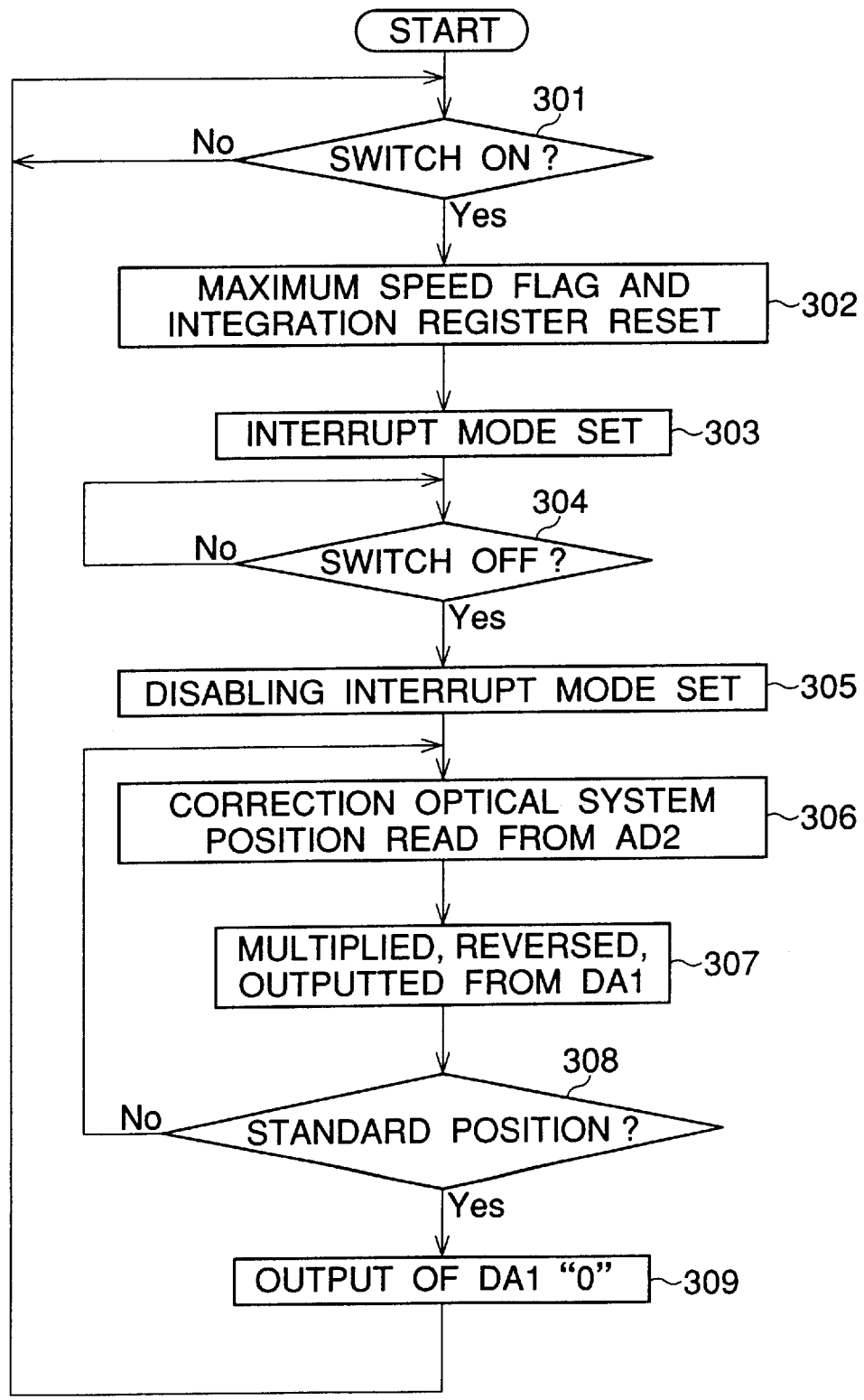
FIG. 3 is a flow chart indicating a main operating routine of the first embodiment.
Figure 4:
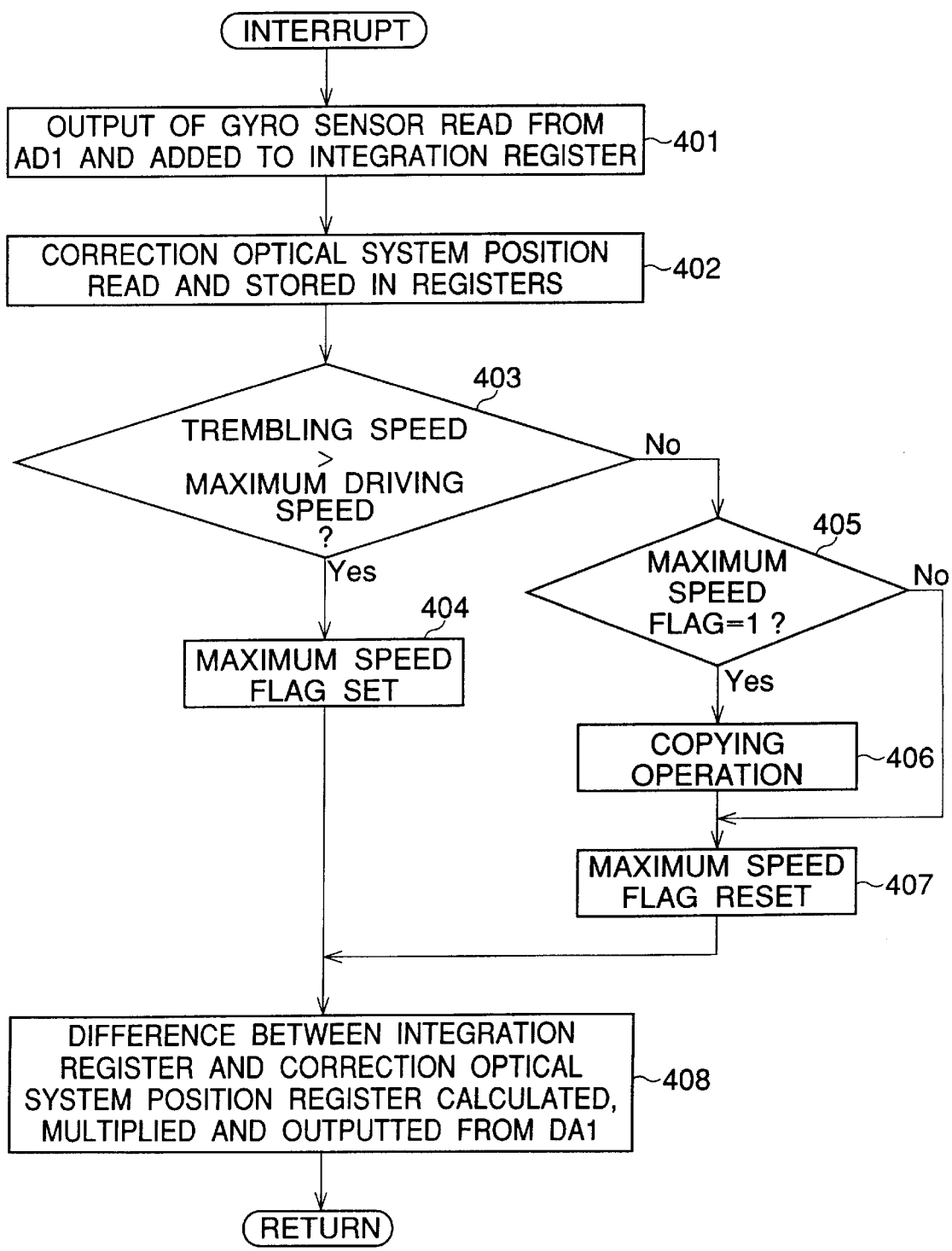
FIG. 4 is a flow chart indicating an interruption routine of the first embodiment.

FIG. 3 is a flow chart which shows a procedure of the correction control of the trembling in the first embodiment, and FIG. 4 is a flow chart which shows an interruption routine executed in step 303 of FIG. 3 during operation of the correction control. Note that a maximum speed flag shows whether the trembling speed is higher than the maximum driving speed of the correction lens 28, and is assigned at a specific bit in a specific memory.

When the optical device is turned ON, the procedure shown in FIG. 3 is started by the CPU 200. In step 301, it is judged whether the switch 201 is turned ON. If the switch 201 is turned ON, the process proceeds to step 302. If the switch 201 is not turned ON, step 301 is repeatedly executed. In step 302, the maximum speed flag and the integration register 221 are initialized. In step 303, an interrupt mode is set in operation.

In step 304, it is judged whether the switch 201 is turned ON, if the switch 201 is OFF, the process proceeds to step 305, and a disabling interrupt mode is set in operation. If the switch 201 is turned ON, step 304 is repeatedly executed until the switch 201 is turned OFF, while maintaining operation of the interrupt mode. Namely, after the interrupt mode is set, the interrupt mode continually operates while the switch 201 is kept ON.

After the interruption routine, shown in FIG. 4, is started, in step 401, the input signal, inputted to the first A/D converting input terminal AD1, is converted to a digital signal and integrated in the integration register 221. The integration in the integration register 221 is performed in accordance with the direction of the movement of the optical axis, for example, as described below. In a case where the optical axis is moved in the right direction, and then is moved in the left direction, for example, with respect to the movement in the right direction, the input signal is added to a previous value of the integration register 221, and, with respect to the movement in the left direction, the input signal, as a negative, is added to a previous value of the integration register 221. Namely, with respect to the movement in the left direction, the input signal is subtracted from the previous value. By the integration described above, the trembling angular data of the optical device, i.e. a data indicating the difference between the previous angular data and the new angular data of the optical axis, is stored in the integration register 221.

In step 402, the input signal, inputted to the second A/D converting input terminal, is converted to a digital signal, and the position data of the correction lens 28, namely a data indicating the distance between the correction lens 28 and the optical axis of the optical device, is stored in the correction optical system position register 222.

In step 403, a trembling speed of the focused image and the maximum driving speed of the correction lens 28, stored in the ROM 223, are compared. The trembling speed is a speed calculated by an operation as follows. The angular speed of the optical axis of the optical device, outputted from the lateral-direction gyro sensor 202 and inputted to the first A/D converting input terminal AD1, is amplified and adapted to a trembling speed of the focused image on an image plane by multiplying by a predetermined factor, so that the trembling speed of the focused image is obtained. If the trembling speed of the focused image is higher than the maximum driving speed of the correction lens 28, the maximum speed flag is set to "1" in step 404, and the process proceeds to step 408.

On the other hand, if the trembling speed of the focused image is not higher than the maximum speed, it is judged whether the value of the maximum speed flag is "1" in step 405. If the value is "1", the position data, stored in the correction optical system position register 222, is copied to the integration register 221 in step 406. In step 407, the maximum speed flag is reset to "0", and the process proceeds to step 408. If the value is not "1", the process jumps to step 407, the maximum speed flag is reset to "0", and the process proceeds to step 408.

Namely, the process proceeds to step 406 when the trembling speed of the focused image changes from a higher speed than the maximum driving speed of the correction lens 28, to a lower speed than the maximum speed. In this situation, the position data, stored in the correction optical system position register 222, is copied to the integration register 221. In other words, the data of the integration register 221 is replaced with the data of the correction optical system position register 222.

In step 408, the difference between the trembling angular data of the optical device, stored in the integration register 221, and the position data of the correction lens 28, stored in the correction optical system position register 222, is calculated. The difference is multiplied by a predetermined factor, and is outputted from the D/A converting output terminal DA1. After that, the process is returned to step 304 of the flow chart shown in FIG. 3.

As described above, in a situation where the trembling speed of the focused image continues to be higher or lower than the maximum driving speed of the correction lens 28, the trembling angular data of the optical axis of the optical device and the position data of the correction lens 28 are compared, and the first direct-drive-type actuator 131 is driven so that the difference between the respective position data is canceled.

When the trembling speed of the focused image is decreased from higher than the maximum driving speed of the correction lens 28 to lower than the maximum speed, the computing operation for driving the correction lens 28 is performed after the position data of the correction lens 28 replaces the angular data of the optical axis of the optical device. Consequently, the correction lens 28 is forced to stop at a current position and stay at the current position until a next interruption routine occurs. Further, if, at the next interruption routine, the data of the integration register 221 has changed and a difference between the respective position data is now apparent, the correction lens 28 is driven from the current position in order to correct the trembling of the focused image.

After the interruption routine ends, and the process returns to the main operating routine shown in FIG. 3, if the switch 201 is turned OFF, the process proceeds to step 305. In step 305, the disabling interrupt mode is set in operation. In step 306, the input signal inputted to the second A/D converting input terminal AD2, i.e. the position data of the correction lens 28, is converted to a digital signal and is read in the CPU 200. In step 307, the digital signal is multiplied by a predetermined factor, reversed, and outputted from the D/A converting output terminal DA1 to the lateral-direction power amplifier 206, so that the first direct-drive-type actuator 131 is driven. The signal, by which the first direct-drive-type actuator 131 is driven, is generated by reversing the input signal inputted to the second A/D converting input terminal AD2. Accordingly, the correction lens 28 is moved in the direction, whereby the optical axis OP of the correction lens 28 becomes coaxial with the optical axes of the other optical systems of the optical device.

In step 308, it is judged whether the optical axis of the correction lens 28 is placed has reached the standard position. If the optical axis is at the standard position, the process proceeds to step 309. In step 309, the driving of the correction lens 28 is stopped, and the process returns to step 301. If the optical axis Op has not reached the standard position, the process returns to step 306. Namely, step 306 to step 308 returns the correction lens 28 to the standard position. While the switch 201 is OFF, the correction of the trembling of the focused image is not performed, and the optical axis of the correction lens 28 should be at the standard position. Accordingly, the process from step 306 to step 308 is performed.

Figure 5:
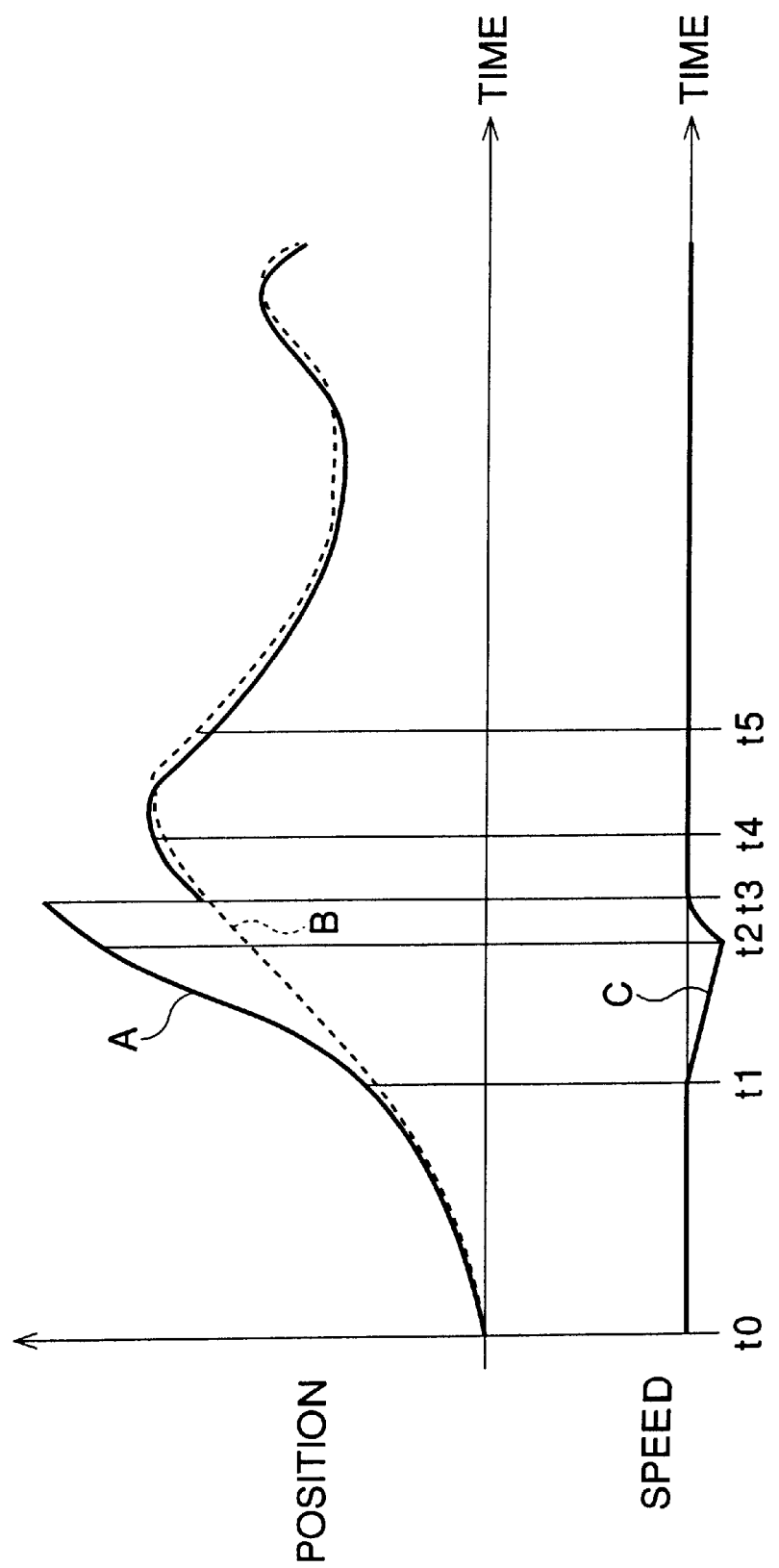
FIG. 5 is a graph showing a position of the optical device relative to a trembling of a focused image, according to the first embodiment.

FIG. 5 is a graph showing change of the trembling angle of the optical axis of the optical device and the position of the correction lens 28, and the difference between the trembling speed of the focused image and the speed of the movement of the correction lens 28. In FIG. 5, a solid line A indicates the change of the data of the integration register 221 in the CPU 200. As described above, in the integration register 221, the angular speed of the optical axis of the optical device, which is outputted from the lateral-direction gyro sensor 202, is integrated. Namely, the solid line A is a wave indicating the change of the trembling angular data of the optical axis of the optical device. This wave is called "focus trembling wave" hereinafter. A broken line B is a wave indicating the change of the position of the correction lens 28. A solid line C is a wave indicating the change of the difference obtained by subtracting the speed of the change of the position of the correction lens 28 from the trembling speed.

At time t0, the driving operation of the correction lens 28 starts. From time t0 to time t1, the amount of the change of the trembling angular data of the optical axis of the optical device approximately equals the amount of the change of the position of the correction lens 28. Namely, the driving speed of the correction lens 28 follows the trembling speed of the focused image. There is negligible difference between the driving speed and the trembling speed.

From time t1 to time t2, the trembling speed slightly increases to exceed the maximum driving speed of the correction lens 28. After time t2, even though the amount of change of the position of the optical device gradually increases, the amount of change in the broken line B is constant, since the amount of change of the position of the correction lens 28 reaches a maximum. Since the trembling speed continues to increase after having exceeded the maximum driving speed of the correction lens 28, the solid line C, indicating the difference between the trembling speed and the driving speed, declines.

From time t2 to time t3, the trembling speed begins to decrease. At time t3, the trembling speed becomes lower than the maximum driving speed of the correction lens 28, and the driving speed of the correction lens 28 is able to follow the trembling speed. Namely, the difference between the trembling speed and the driving speed of the correction lens 28 is indicated by "0" deviation being exhibited by the solid line C. At this moment, the position data of the correction lens 28 is copied to the integration register 221 in which the trembling angular data of the optical device is stored. Namely, the difference between the position data of the correction lens 28 and the trembling angular data of the optical device is replaced with "0". Accordingly, as shown in FIG. 5, the value of the solid line A approximately equals the value of the broken line B, at time t3. After time t3, the trembling speed is maintained below the maximum driving speed of the correction lens 28, and the difference between the trembling speed and the driving speed is shown as "0" deviation of the solid line C.

As described above, according to the first embodiment, at the moment when the trembling speed in the lateral direction changes, from higher than the maximum driving speed of the correction lens 28, to lower than the maximum driving speed, the position data of the correction lens 28 is copied to the position data of the optical device. In other words, the difference value between the position data of the correction lens 28 and the position data of the optical device is set to "0". Consequently, the correction lens 28 is not driven, and is compulsorily stopped at the current position at the moment the difference value is set to "0". The correction lens 28, forced to stop as described above, stays at the position until the value of the integration register 221 changes and the difference value is not "0". After that, when the interruption routine occurs and the difference value is generated again, the correction of the trembling is restarted. Accordingly, the problem where, even though the trembling speed slows down, the correction lens 28 is still driven at the maximum speed, is prevented.

Note that with respect to the lengthwise direction, a similar correction to that, described above, in the lateral direction, is performed.

Figure 6:
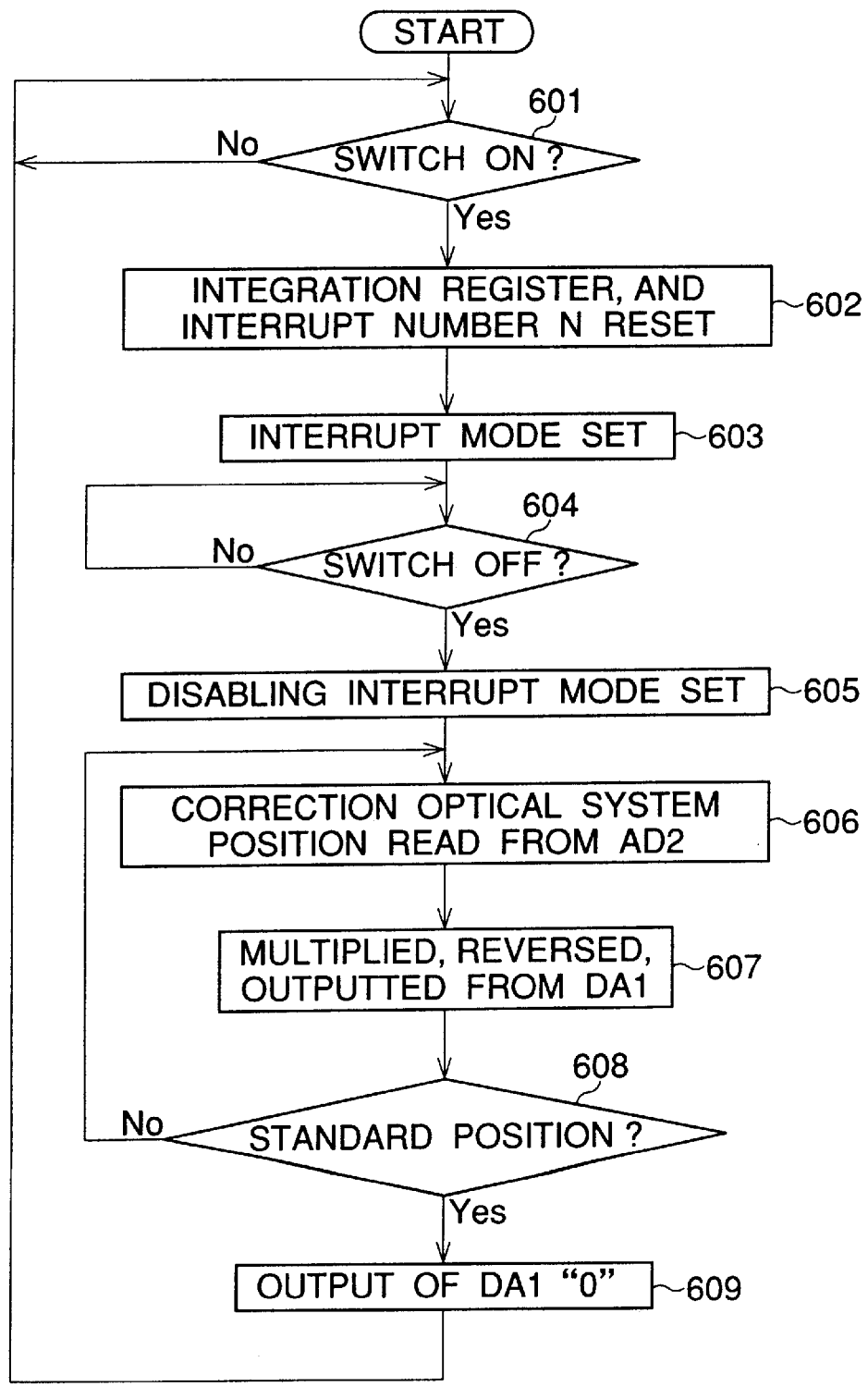
FIG. 6 is a flow chart indicating a main operating routine of a second embodiment.
Figure 7:
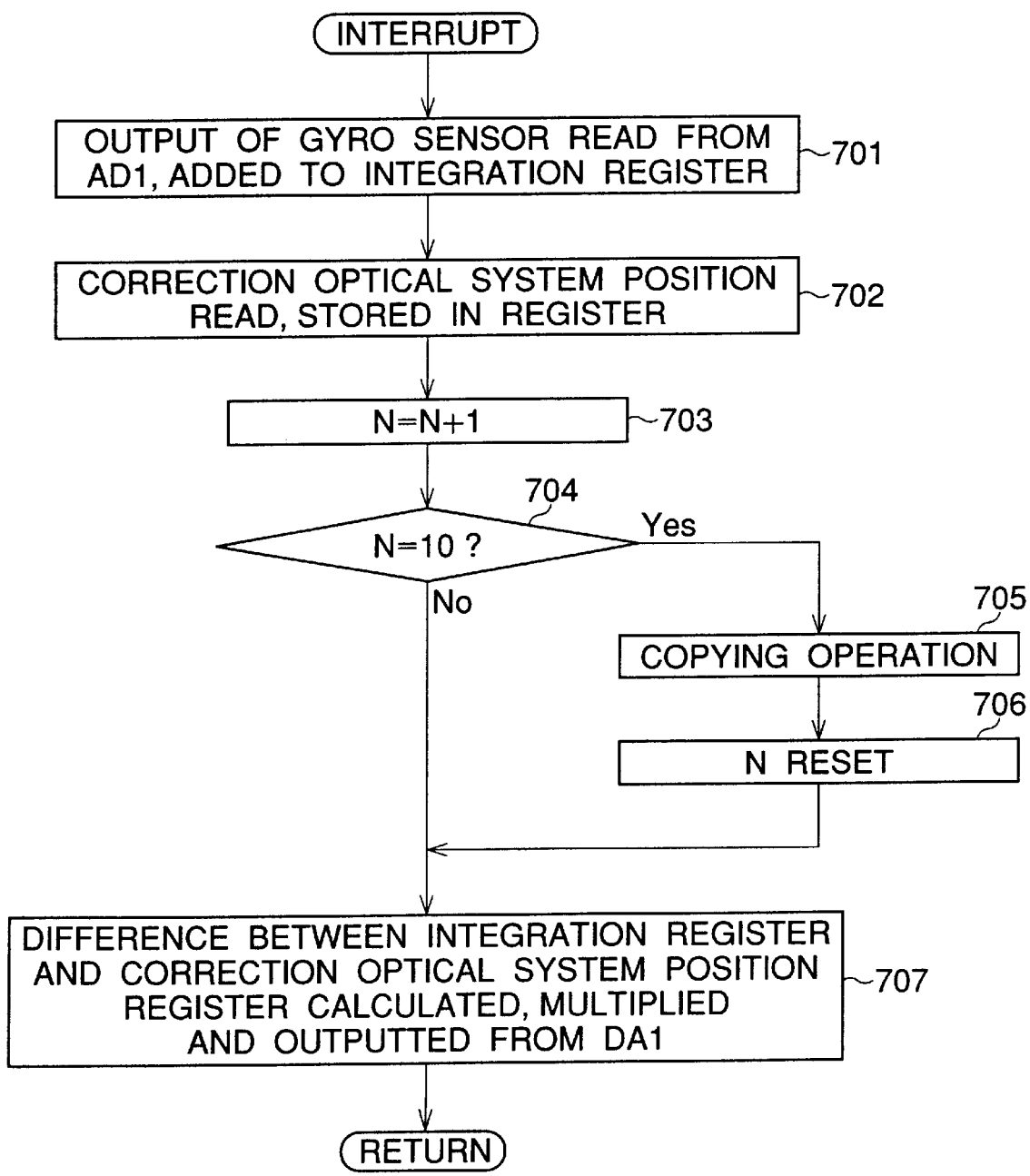
FIG. 7 is a flow chart indicating an interruption routine of the second embodiment.

FIG. 6 is a flow chart which shows a procedure for the correction control of the trembling in the second embodiment, and FIG. 7 is a flow chart which shows the interruption routine performed at step 603 in the correction control of the second embodiment. Note that: the construction of an optical device to which the second embodiment is applied, is similar to that of the optical device of the first embodiment; terms used in the flow charts of FIGS. 6 and 7, such as integration register, correction optical system position register, are identical in meaning to those of the first embodiment and are thus not described in detail again.

When the optical device is turned ON, the procedure shown in FIG. 6 is started. In step 601, it is judged whether the switch 201 is turned ON. If the switch 201 is turned ON, the process proceeds to step 602. If the switch 201 is not turned ON, step 601 is repeated executed. In step 602, a variable N, which shows an interruption time, and the integration register 221 are initialized. In step 603, an interrupt mode is set in operation.

In step 604, it is judged whether the switch 201 is turned ON, if the switch 201 is turned OFF, the process proceeds to step 605, and the disabling interrupt mode is set in operation. If the switch 201 is turned ON, the operation of the interrupt mode is continued, and the process does not proceed to any other step. Namely, after the interrupt mode is set in operation, the interrupt mode continues while the switch 201 is ON.

After the interruption routine, shown in FIG. 7, is started in step 603 of FIG. 6, in step 701, a signal, inputted to the first A/D converting input terminal AD1, is converted to a digital signal, and the digital signal is integrated in the integration register 221, so that the trembling angular data of the optical device is stored in the integration register 221. The input signal is obtained by amplifying the angular speed of the optical axis of the optical device, outputted from the lateral-direction gyro sensor 202.

In step 702, a signal, inputted to the second A/D converting input terminal AD2, is converted to a digital signal, and the digital signal is stored in the correction optical system position register 222. The input signal is the position data of the correction lens 28, outputted from the first PSD 204.

In step 703, the value of the variable N is increased by "1". In step 704, it is judged whether the value equals "10". If the value does not equal "10", the process proceeds to step 707.

If the value of the variable N equals "10", the process proceeds to step 705. In step 705, the position data of the correction lens 28, stored in the correction optical system position register 222, is copied to the integration register 221. In step 706, the value is reset to "0". After that, the process proceeds to step 707.

In step 707, the difference between the trembling angular data of the optical device, stored in the integration register 221, and the position data of the correction lens 28, stored in the correction optical system position register 222, is calculated, multiplied by a predetermined factor, and outputted from the D/A converting output terminal DAM. After that, the process returns to step 604 of the flow chart shown in FIG. 6.

As described above, at a predetermined interval, the data stored in the correction optical system position register 222 is copied to the integration register 221, and the calculation for driving the correction lens 28 is performed. Regardless of whether the trembling speed is higher than the maximum driving speed of the correction lens 28, the copying operation and the calculation are repeatedly performed at every tenth performance of the integration routine.

After returning from the interruption routine to the procedure of the correction control of the trembling, the operation from step 605 to step 609 is identical to the operation from step 305 to step 309 in the flow chart of the first embodiment, shown in FIG. 3, and as such is not described again.

Figure 8:
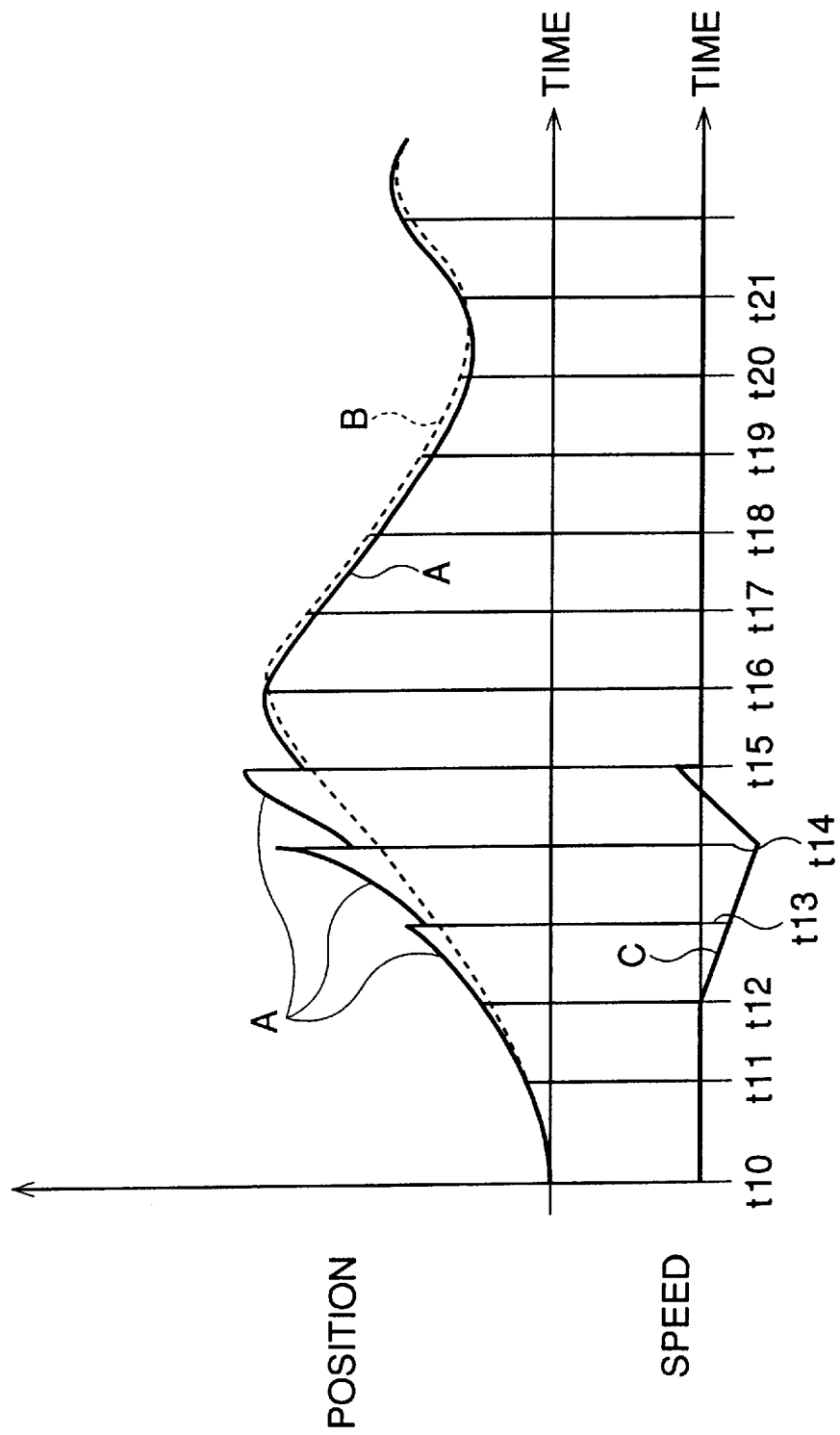
FIG. 8 is a graph showing the position of the optical device relative to the trembling of the focused image, according to the second embodiment.

FIG. 8 is a graph showing the change in the position of the optical axis of the optical device relative to the position of the correction lens 28, and the difference between the speed of the trembling of the focused image and the speed of the movement of the correction lens 28. In FIG. 8, a solid line A, a broken line B and a solid line C are similar to those of the graph shown in FIG. 5.

From time t12 to time t15, the trembling speed is higher than the maximum driving speed of the correction lens 28. At times t13, t14 and t15, which correspond to a predetermined interval, in this second embodiment being the elapsed time for the variable N to become "10", the data stored in the correction optical system position register 222 is copied to the integration register 221. Similarly, from time t10 to time t12, and from time t15 to time t21, the copying operation is also performed at the predetermined interval, even though the trembling speed is lower than the maximum driving speed of the correction lens 28.

As described above, according to the second embodiment, the judgment of whether the trembling speed is higher than the maximum driving speed of the correction lens 28 is not necessary. Consequently, the operation is simplified, while still obtaining a similar effect to that of the first embodiment.

Note that, in step 704, it may be judged whether the variable N equals "1", so that the copying operation and the calculation are performed at every execution of the interruption routine. Consequently, the above mentioned predetermined interval would then be the time for the variable N to reach "1". Namely, the above mentioned predetermined interval can be the interval of A/D conversion by the first and second A/D converting terminals AD1 and AD2.

Figure 9:
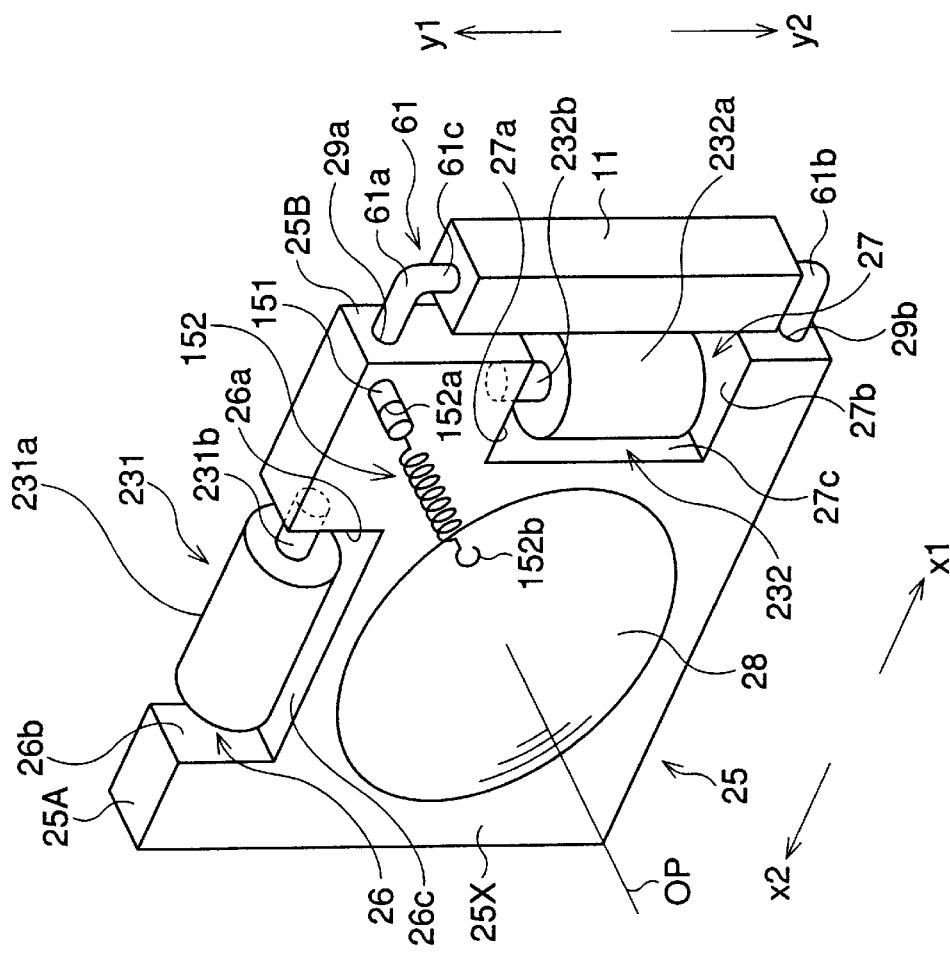
FIG. 9 is a perspective view of an optical device of a third embodiment.

FIG. 9 is a perspective view showing a mechanism for correcting a tremble of a focused image, to which a third embodiment, according to the present invention, is applied. A first direct-drive-type actuator 231 comprises a motor case 231a and a movable shaft 231b. A stepping motor (omitted in FIG. 9) is mounted in the motor case 231a. The shaft 231b rotatably extends or retracts along the longitudinal axis thereof, in accordance with a clockwise or counterclockwise rotation of the stepping motor. Similarly, a second direct-drive-type actuator 232 comprises a motor case 232a and a movable shaft 232b. A stepping motor (omitted in FIG. 9) is mounted in the motor case 232a. The shaft 232b rotatably extends or retracts along the longitudinal axis thereof, in accordance with a clockwise or counterclockwise rotation of the stepping motor.

The correction lens 28 is driven by a moving amount corresponding to a number of driven steps of the stepping motor. The position data of the optical device can be obtained by calculating a product of an accumulated number of the driven steps and the moving amount, instead of a detection mechanism involving a PSD and an LED. Accordingly, the PSD's and the LED's of the first and second embodiments are unnecessary in the third embodiment. The other structures are similar to those of the first embodiment. In FIG. 9, components utilized in the third embodiment, which are identical in the first embodiment, share the same reference numerals.

Figure 10:
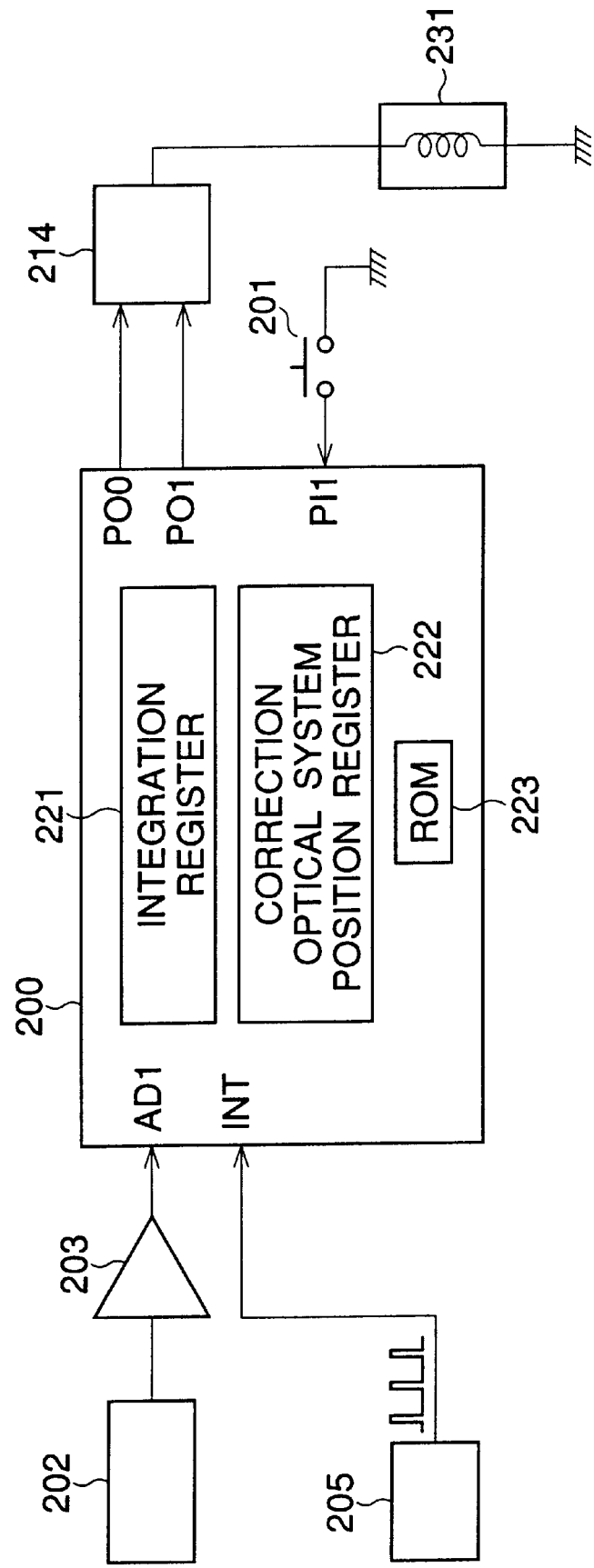
FIG. 10 is a block diagram of the third embodiment.

FIG. 10 is a block diagram showing an electronic structure of control circuits for the trembling, provided in the optical device of the third embodiment, which correct the trembling of the focused image in the lateral-direction. In FIG. 10, components utilized in the third embodiment, which are identical in the first embodiment, share the same reference numerals. In The CPU 200, a digital signal, converted by the first A/D converting input terminal AD1, is subjected to predetermined operations, such as integration and the like, and then a control signal of two bits is outputted from output ports PO0 and PO1. A lateral-direction driving circuit 214 generates and outputs a driving signal, by which the stepping motor of the first direct-driven-type actuator 231 is driven in accordance with the two bit control signal to the stepping motor.

The position data of the correction lens 28 is calculated by multiplying a driving amount of the lens holding frame 25, corresponding to a rotation of one step of the stepping motor, by a number of steps of the stepping motor. The position data is stored in the correction optical system position register 222.

Note that equipment, such as a gyro sensor and a lengthwise-direction driving circuit for correcting the trembling in the lengthwise direction, which are similar to the equipments relating to the lateral direction, are connected to the CPU 200, so that, with respect to the lengthwise direction, a similar correction to that occurring in the lateral direction is performed.

Figure 11:
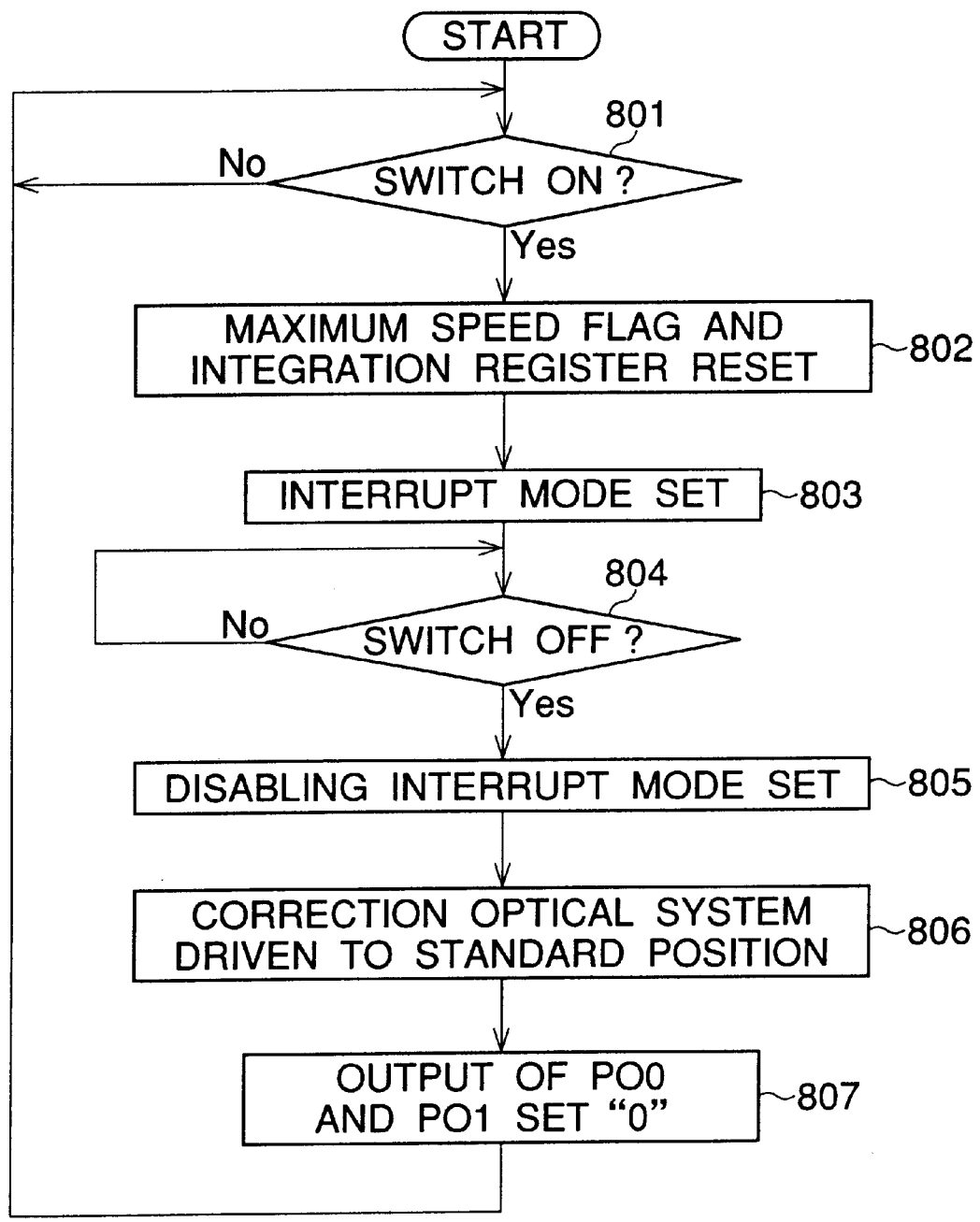
FIG. 11 is a flow chart indicating a main operating routine of the third embodiment.
Figure 12:
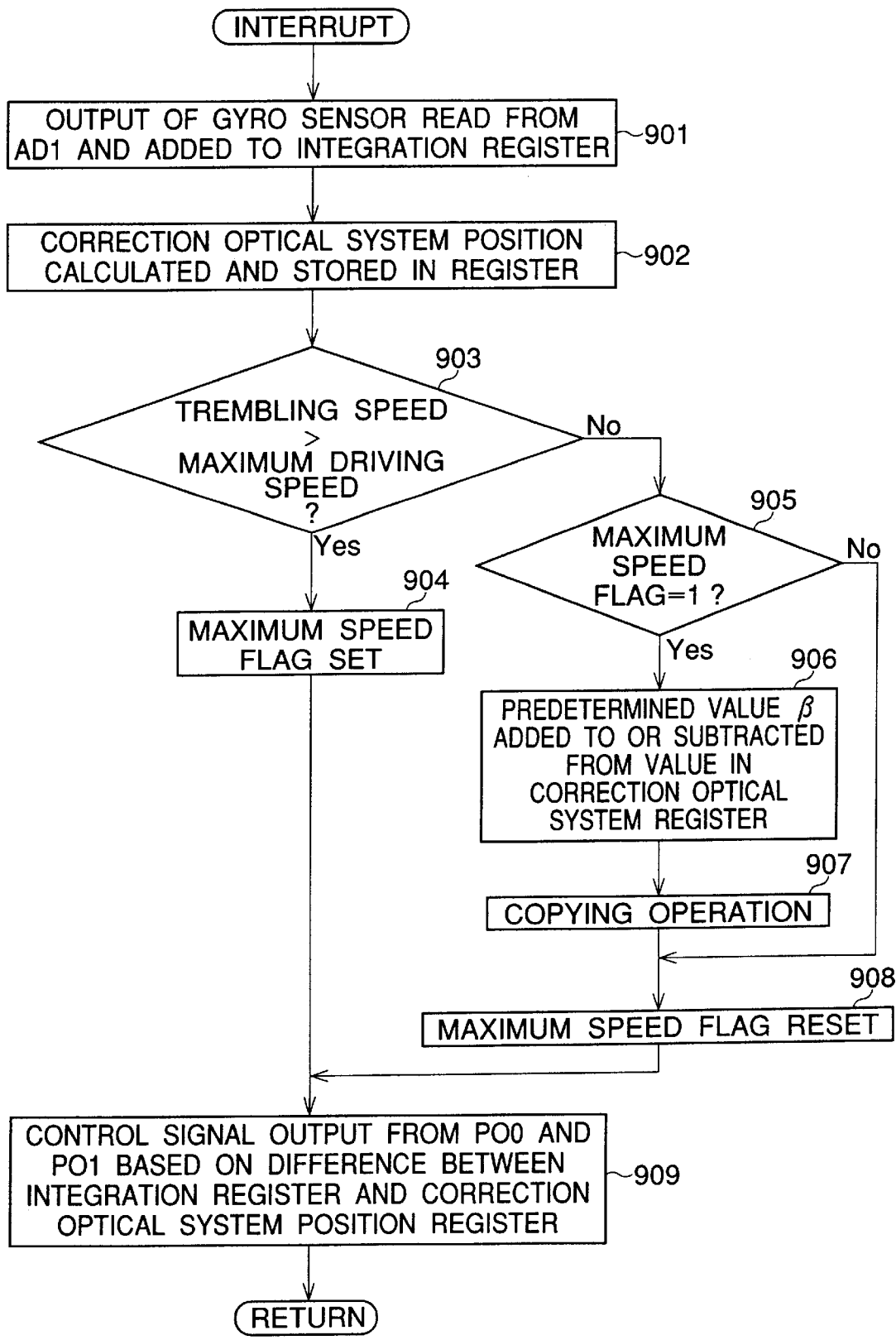
FIG. 12 is a flow chart indicating an interruption routine of the third embodiment.

FIG. 11 is a flow chart which shows a procedure of the correction control of the trembling in the third embodiment, and FIG. 12 is a flow chart which shows an interruption routine executed in step 803 of FIG. 11 during operation of the correction control. The operation from step 801 to step 805 is identical to the operation from step 301 to step 305 in the flow chart of the first embodiment, shown in FIG. 3, and as such is not described again. After an interrupt mode is set in step 803, the interrupt mode remains set with the interruption routine, shown in FIG. 12, continually operating while the switch 201 is kept ON.

In step 901 in FIG. 12, similar operations to those of step 401 in FIG. 4 are performed. Namely, the input signal, inputted to the first A/D converting input terminal AD1, is converted to a digital signal and integrated in the integration register 221, so that the trembling angular data of the optical device is stored in the integration register 221. In step 902, a current position data of the correction lens 28 is calculated by multiplying a driving amount of the lens holding frame 25, corresponding to a rotation of one step of the stepping motor, by a number of steps of the stepping motor. The position data of the correction lens 28 is then stored in the correction optical system position register 222.

The operation from step 903 to step 905 is identical to the operation from step 403 to step 405 in the flow chart of the first embodiment, shown in FIG. 4. In step 905, when it is judged that the value of the maximum speed flag is "1", the process proceeds to step 906. In step 906, a predetermined value β is added to or subtracted from the value stored in the correction optical system position register 222. When the predetermined value β is higher than a threshold value by which the operation of the stepping motor is performed, step driving of the stepping actuator occurs. In this embodiment, the predetermined value β is determined to be higher than the threshold.

Whether addition or subtraction of the predetermined value β is to be performed is decided in accordance with the moving direction of the correction lens 28. For example, movement of the correction lens 28 in the right direction is regarded as positive movement, and movement in the left direction is regarded as negative movment. If the correction lens 28 has been moved in the right direction, the predetermined value β is added to the value of the correction optical system position register 222, and if the correction lens 28 has been moved in the left direction, the predetermined value β is subtracted from the value of the correction optical system position register 222.

In step 907, the position data, having the predetermined value β added to or subtracted from, is copied to the integration register 221. In step 908, the maximum speed flag is initialized and the process proceeds to step 909. In step 909, the difference between the trembling angular data of the optical device, stored in the integration register 221, and the position data of the correction lens 28, stored in the correction optical system position register 222, is calculated. The number of driving steps, by which the stepping motor is driven so as to cancel the difference, is calculated, and the control signals corresponding to the number of driving steps are outputted from the output port PO0 and PO1. By addition or subtraction of the predetermined value β higher than the threshold value, the stepping motor is driven at least one step when the trembling speed of the focused image changes from a higher speed than the maximum driving speed of the correction lens 28, to a lower speed than the maximum speed.

After the interruption routine ends, and the process returns to the main operating routine shown in FIG. 11, if the switch 201 is turned OFF, the process proceeds to step 805. In step 805, the disabling interrupt mode is set. In step 806, the correction lens 28 is moved to the standard position in accordance with the accumulated step number of the stepping motor. In step 807, the output signals of the output ports PO0 and PO1 are set to "0".

As described above, in the third embodiment, the predetermined value β is added to or subtracted from the data of the correction optical system position register 222, so that a data, higher or lower than the data of the correction optical system position register 222 by the predetermined value β, is copied to the integration register 221. Accordingly, a voltage drop to the respective actuator is avoided at an instant when the calculation of the difference between the data of both registers is performed. Therefore, the driving control of the correction lens 28 is more smoothly performed.

As described above, according to the present invention, a stable control of the correction of the trembling is performed at all times, even if the trembling speed exceeds the maximum driving speed of the correction optical system.

The present disclosure relates to subject matter contained in Japanese Patent Application No.09-268065 (filed on Sep. 12, 1997) which is expressly incorporated herein, by reference, in its entirety.

What is claimed is:

1. A mechanism correcting a trembling of a focused image comprises:
   a detector that detects an angular speed of a trembling of an optical axis of an optical device;
   an integrator that converts said angular speed to an angular data of said optical axis by integrating outputs from said detector;
   a correction optical system that corrects a trembling of a focused image;
   driving systems that drive said correction optical systems;
   obtaining systems that obtain a position data of said correction optical systems; and
   a controlling system that controls said driving systems such that a difference between said angular data of said optical axis and said position data of said correction optical system is canceled; wherein
   said controlling system replaces a value outputted from said integrator with a value substantially equivalent to a value outputted from said obtaining systems, on the occurrence of a predetermined condition.

2. A mechanism correcting a trembling of a focused image according to claim 1, wherein said controlling system replaces said value outputted from said integrator with said value outputted from said obtaining systems when a trembling speed of said optical axis changes from a speed higher than a maximum speed of said driving system to a speed lower than said maximum speed.

3. A mechanism correcting a trembling of a focused image according to claim 1, wherein said controlling system replaces said value outputted from said integrator with said value outputted from said obtaining systems at predetermined periodic intervals during the driving of said correction optical system.

4. A mechanism correcting a trembling of a focused image according to claim 2, wherein said controlling system modifies said value outputted from said obtaining systems by a predetermined value, and replaces said value outputted from said integrator with said value outputted from said obtaining systems, so as to maintain a driving direction of said correction optical system when said value outputted from said obtaining systems replaces said value outputted from said integrator.

5. A mechanism correcting a trembling of a focused image according to claim 4, wherein said controlling system increases said value outputted from said obtaining systems by said predetermined value when said driving direction is a first direction, and said controlling system decreases said value outputted from said obtaining systems by said predetermined value when said driving direction is a second direction opposite to said first direction.

6. A mechanism correcting a trembling of a focused image according to claim 5, wherein said driving systems include a stepping actuator, said correction optical system being driven by a predetermined amount at every step by which said stepping actuator is driven, and, when said predetermined value is higher than a threshold value by which the step driving of said stepping actuator is performed, step driving of said stepping actuator occurs.

7. A mechanism correcting a trembling of a focused image according to claim 3, wherein said controlling system modifies said value outputted from said obtaining systems by a predetermined value, and replaces said value outputted from said integrator with said value outputted from said obtaining systems, so as to maintain a driving direction of said correction optical system when said value outputted from said obtaining systems replaces said value outputted from said integrator.

8. A mechanism correcting a trembling of a focused image according to claim 7, wherein said controlling system increases said value outputted from said obtaining systems by said predetermined value when said driving direction is a first direction, and said controlling system decreases said value outputted from said obtaining systems by said predetermined value when said driving direction is a second direction opposite to said first direction.

9. A mechanism correcting a trembling of a focused image according to claim 8, wherein said driving systems include a stepping actuator, said correction optical system being driven by a predetermined amount at every step by which said stepping actuator is driven, and, when said predetermined value is higher than a threshold value by which the step driving of said stepping actuator is performed, step driving of said stepping actuator occurs.

10. A mechanism correcting a trembling of a focused image according to claim 1, wherein said driving systems include an actuator which is provided with an electromagnetic coil, and said obtaining systems optically senses said position data.

11. A mechanism correcting a trembling of a focused image according to claim 1, wherein said driving systems include a stepping actuator, and said obtaining systems calculate said position data by a numbers of steps by which said stepping actuator is driven.

12. A mechanism correcting a trembling of a focused image comprises:
  a detector that detects an angular speed of a trembling of an optical axis of an optical device;
  integrators that convert said angular speed to an angular data of said optical axis by integrating outputs from said detector;
  correction optical systems that correct a trembling of a focused image;
  driving systems that drive said correction optical systems;
  obtaining systems that obtain a position data of said correction optical systems; and
  a controlling system that controls said driving systems such that a difference between said angular data of said optical axis and said position data of said correction optical systems is canceled; wherein
  said controlling system stops said driving systems, halting said correction optical systems at a current position, on the occurrence of a predetermined condition.

13. A mechanism correcting a trembling of a focused image according to claim 12, wherein, on the occurrence of said predetermined condition, said difference is deemed to be zero and said controlling system stops said correction optical systems at said current position.

14. A method for correcting a trembling of a focused image comprises:
  a first step in which an angular speed of an optical axis of an optical device is sensed;
  a second step in which said angular speed is integrated and converted to an angular data of said optical axis;
  a third step in which a position data of correction optical systems, which correct a trembling of a focused image, is obtained; and
  a fourth step in which said correction optical systems are driven such that a difference between said angular data and said position data is canceled;
  wherein, in said fourth step, said angular data is replaced with data substantially equivalent to said position data on the occurrence of a predetermined condition.

15. A method for correcting a trembling of a focused image according to claim 14, wherein said predetermined condition is that a trembling speed of said optical axis changes from a speed higher than a maximum speed of said driving system to a speed lower than said maximum speed.

16. A method for correcting a trembling of a focused image according to claim 14, wherein said predetermined condition is that a predetermined time elapses.

* * * * *